(12) United States Patent
Woodward

(10) Patent No.: US 6,955,257 B2
(45) Date of Patent: Oct. 18, 2005

(54) ADJUSTABLE MOUNTING FOR STUB IDLER APPARATUS

(75) Inventor: William S. Woodward, Green Bay, WI (US)

(73) Assignee: ASGCO Manufacturing, Inc., Allentown, PA (US)

(*) Notice: Subject to any disclaimer, the term of this patent is extended or adjusted under 35 U.S.C. 154(b) by 55 days.

(21) Appl. No.: 10/668,572

(22) Filed: Sep. 23, 2003

(65) Prior Publication Data

US 2005/0061635 A1 Mar. 24, 2005

(51) Int. Cl.[7] ................................................ B65G 39/10
(52) U.S. Cl. ........................................ 198/842; 198/840
(58) Field of Search .................................. 198/842, 840

(56) References Cited

U.S. PATENT DOCUMENTS

| | | | | |
|---|---|---|---|---|
| 1,276,724 A | * | 8/1918 | Cowley | 198/842 |
| 2,592,915 A | * | 4/1952 | Lee | 198/842 |
| 2,712,378 A | * | 7/1955 | Eggleston | 198/842 |
| 2,995,945 A | * | 8/1961 | Lorig | 198/840 |
| 3,144,235 A | * | 8/1964 | Reilly | 248/251 |
| 3,191,760 A | * | 6/1965 | Herzog | 198/842 |
| 3,212,626 A | * | 10/1965 | McLeish et al. | 198/842 |
| 4,280,619 A | | 7/1981 | Ward et al. | |
| 4,609,097 A | | 9/1986 | Dos Santos | |
| 4,703,846 A | | 11/1987 | Salminen et al. | |
| 4,751,999 A | | 6/1988 | Opperthauser | |
| 4,830,179 A | | 5/1989 | Fyfe | |
| 4,844,241 A | | 7/1989 | Woodward | |
| 4,903,820 A | | 2/1990 | Fyfe | |
| 5,027,940 A | | 7/1991 | Woodward | |
| 5,988,360 A | | 11/1999 | Mott | |
| 6,318,545 B1 | | 11/2001 | Ross, II | |
| 6,349,819 B1 | | 2/2002 | Nohl et al. | |

* cited by examiner

Primary Examiner—Joe Dillon, Jr.
(74) Attorney, Agent, or Firm—Roger W. Herrell; Dann, Dorfman, Herell & Skillman

(57) ABSTRACT

A pair of universal mounting brackets for a stub idler assembly accommodates an attachment of the stub idler assembly to either an upper or a lower face of the conveyor support structure, accommodates a wide range of linear adjustment of the stud idler bearing block with respect to the bracket and the conveyor structure and permits variable angular adjustment of the stub idler through an industry standard range of 5° downwardly from the horizontal.

12 Claims, 5 Drawing Sheets

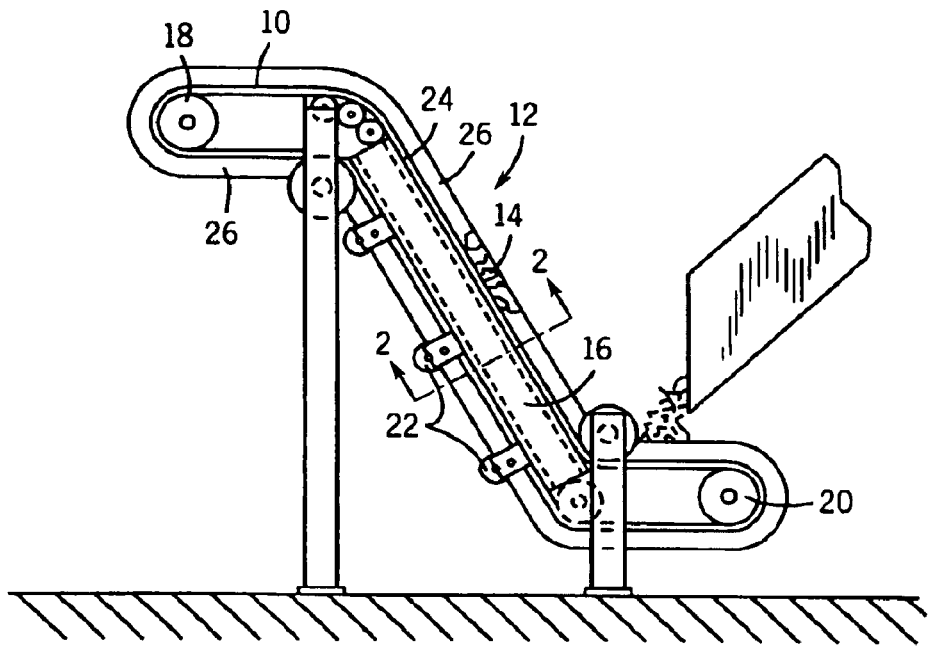
FIG. 1
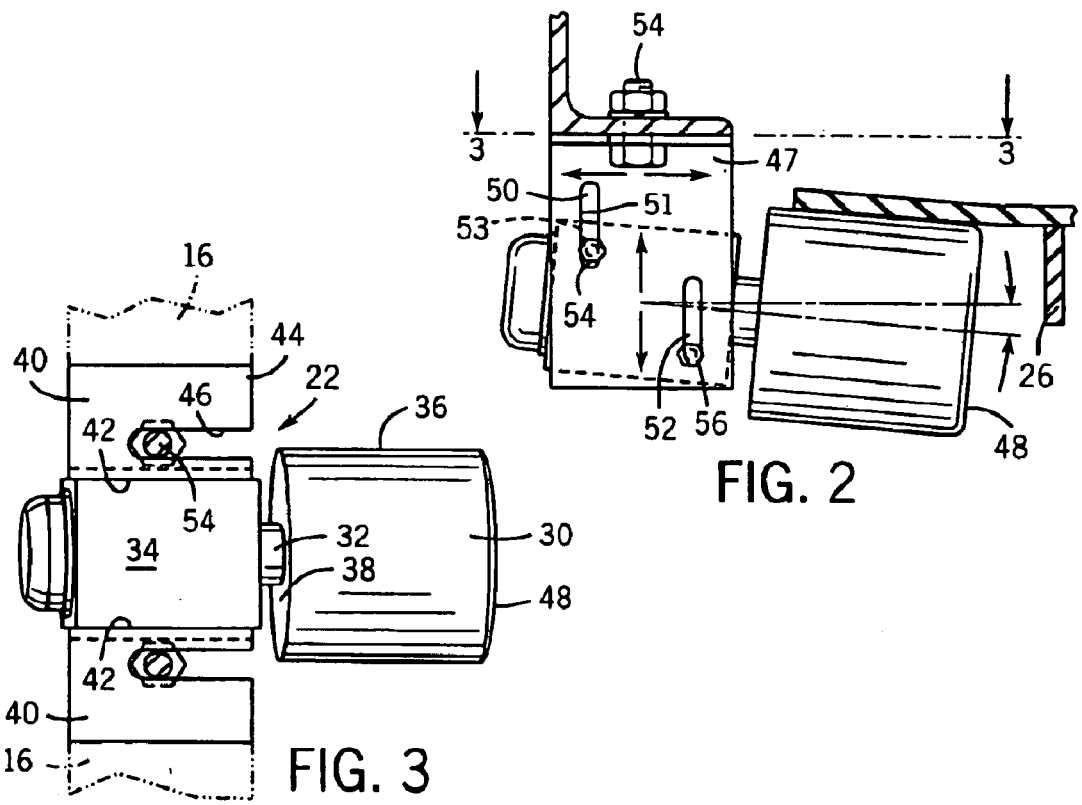
FIG. 2
FIG. 3

ADJUSTABLE MOUNTING FOR STUB IDLER APPARATUS

BACKGROUND OF THE INVENTION

This invention relates to a conveyor stub idler roll apparatus and particularly to means for adjustably mounting a stub idler roll to a conveyor for edge support of the return run of an endless flexible side wall conveyor belt.

This invention is an improvement to my previous inventions disclosed in U.S. Pat. Nos. 4,844,241 and 5,027,940, which are incorporated herein by reference.

The movement of industrial products in the form of particulate and fibrous materials has for years been conveniently done using flat belt conveyors having corrugated sidewalls and cleats secured to the top of the belt, which form pockets in the conveyor belt. Such conveyors are capable of running horizontally, turning up at steep angles (to 90° or vertical) then turning once more to the horizontal position to discharge. Belt speeds range from 150 feet per minute to 500 feet per minute and faster, which subjects the idler bearings and drive system to relatively severe operating conditions.

Stub idlers are cantilevered rollers which run freely on the outboard extension of the base belt on the conveyor, thereby allowing side walls of the belt to hang free between stub idlers on opposite edges of the belt on the return side. Initially, these units were manufactured in the same way as conventional return idlers, having support bearings mounted directly in the roller itself U.S. Pat. Nos. 4,844,241 and 5,027,940 relate to a stub idler unit which supports a larger diameter solid shaft in order to handle high cantilevered loads. The stub idler unit includes bearing support means which are mounted in a support bracket for coupling the idler unit to a stationary support on the conveyor. The stub idler unit includes a shaft which is journaled on the outside of the roller. The shaft accommodates standard, generally accepted roller bearing sizes used throughout the idler industry. The bearing support includes means for lubrication of bearings while the conveyor is in operation.

Experience has shown that rather than mounting the stub idlers in a horizontal position, there is better supporting contact between the belt and the idler if it is declined at an angle. Angling the stub idler roll at a declined angle from center accommodates the natural flexibility of a rubber belt, even though the belt is typically constructed with a cross rigid truss ply. The declining attitude also helps the belt to track better and center itself between the horizontal members of the conveyor frame. In the United States, the conveyor industry has adopted angles of 3° and 5° for typical stub idler mounting. However, there are also applications in which the idlers are mounted with their rotational axes horizontal.

Experience has also shown that during conveyor operation, it is often necessary to change stub idler roll units, as required for maintenance, repair, or replacement of the idler roll. In addition, to reconfigure a conveyor system, it is often necessary to replace existing idler roll units with roll units having rolls of differing diameters. Finally, in order to accommodate stub idler applications with the idler axes at 0°, 3° and 5°, suppliers are required to stock many different mounting shapes and sizes.

It is therefore desirable to provide a mounting mechanism for stub idler rolls that facilitates adjustment in pitch of the stub idler roll to accurately position the roll along the edge of the belt so there is a clearance from the sidewall of ¾ in. or 15% of the recess, whichever is larger, to prevent sidewall wear. It is also desirable to provide mounting means for a stub idler unit that facilitates replacement of idler rolls. It is desirable to provide such a mounting means which is simple and easy to use and consists of a minimal number of parts to minimize the chance for mechanical breakdown. Finally, it would be most desirable to provide a universally adjustable mounting bracket that would accommodate all standard mounting angles, as well as vertical adjustment of the stub idler on the conveyor support structure.

SUMMARY OF THE INVENTION

The present invention is particularly directed to a mounting means for a stub idler roll which facilitates adjustment of horizontal pitch of the idler roll and replacement of the idler roll.

The stub idler roll includes an elongated roll for supporting a conveyor belt, a stub shaft rigidly coupled to an end of the roll and projecting axially outwardly of the roll, and bearing support means aligned to receive and rotatably support the shaft. The mounting means includes at least one but preferably a pair of support brackets which couple the stub idler roll to a support structure on a conveyor in a manner providing vertical and angular adjustment of the stud idler with respect to the bracket. The support bracket includes a mounting face transversely oriented to the end of the roll. The mounting face is adjustably coupled to the bearing support means such that the idler position may be adjustably declined at an angle from horizontal. Simultaneous vertical adjustment is also provided.

In one embodiment, the support bracket includes a bearing mounting face and a conveyor mounting face transversely joined to form an L-shaped member. The bearing face includes a pair of elongated slots, the elongated slot extending transverse to the conveyor face of the bracket and sized to receive connectors for adjustably coupling the bracket to the bearing support means.

Another embodiment includes two support brackets mounted back-to-back, each comprising both an upper slot and a lower slot, the upper and lower slots being parallel and spaced apart equidistant from the center of the bearing face. The upper and lower slots are offset such that one slot is closer to the conveyor mounting face. Preferably, one of the slots is wider than the diameter of a connector belt so the angular position of the idler may be adjusted.

The unique mounting brackets are adapted to removably support the bearing support means, stub shaft and elongated roll from a stationary part of a conveyor, such as a conveyor side rail. A connector, such as a machine screw or bolt, is used to interconnect the bracket and bearing support means. By adjusting the position of the connectors within the upper and lower slots, the pitch of the bearing support means, stub shaft, and elongated roll may be varied, between 0°–50° from horizontal, and the vertical position of the idler with respect to the conveyor support frame and belt may also be varied.

In a presently preferred embodiment of the invention, each mounting bracket includes two pairs of elongated slots in the bearing mounting face, each pair of which is sized and positioned to receive connectors for mounting the bracket to the idler assembly in a manner that provides linear and angular adjustment of the idler assembly with respect to the bracket. One slot of each pair is dimensioned to receive a bolt or similar threaded connector with a slip fit and the other slot is dimensioned to receive the other bolt or threaded fastener with lateral clearance. The slots are offset linearly from one another and the second pair of slots, which is sized and dimensioned the same as the first pair, is positioned to form with the first pair of slots a generally rectangular slot pattern, the pattern comprising a pair of laterally aligned slots dimensioned to alternately receive one of the bolts with a slip fit, and the other pair of slots, linearly offset from the first pair, comprising a pair of laterally aligned slots dimensioned to alternately receive one of the bolts with a clearance. This universal mounting and adjustment pattern permits reuse of brackets and also permits the operator to stock the same bracket pairs for drop and rise applications.

The brackets preferably comprise L-shaped angle members with the bearing mounting face on one leg of the L-shaped member and the conveyor mounting face on the other leg of the member. Each bracket preferably includes a mounting slot in the bearing mounting face of the bracket for receipt of a mounting connector. The mounting slot extends from an open end in one edge of the leg generally perpendicular to the elongated slots in the other leg.

BRIEF DESCRIPTION OF THE DRAWINGS

FIG. 1 is a side view of a conveyor for conveying of fibrous or particulate materials using a flexible side wall belting;

FIG. 2 is an enlarged side view of the stub idler unit taken along 2—2 in FIG. 1, demonstrating the range of position afforded by an embodiment of the unique mounting means; and FIG. 3 is a top view of the stub idler unit taken along 3—3 in FIG. 2.

DETAILED DESCRIPTION OF THE PREFERRED EMBODIMENT

Figure 4:
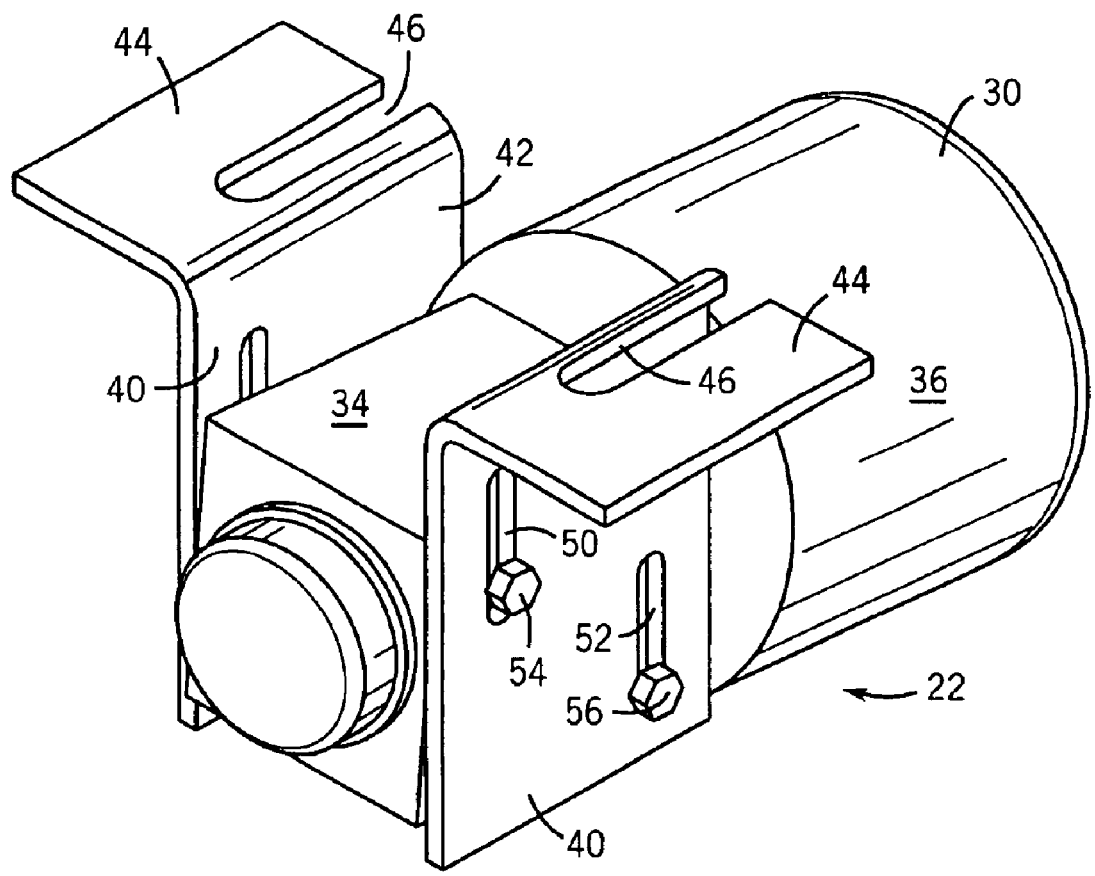
FIG. 4 is an angled rear perspective view of the stub idler unit and the mounting means shown in FIGS. 2 and 3.
Figure 5:
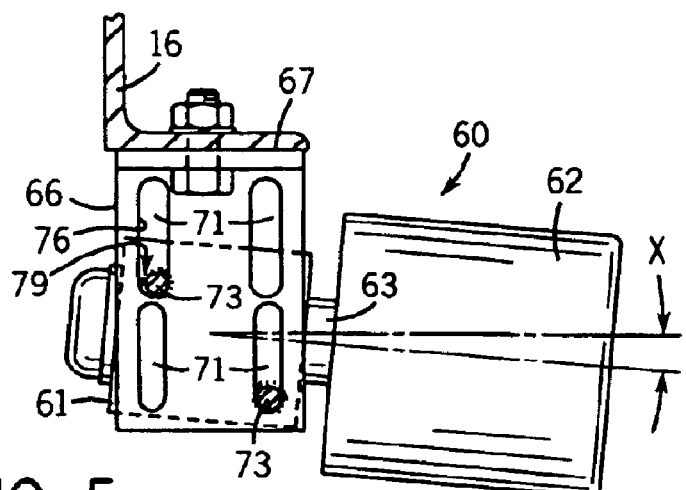
FIG. 5 is a side view of a stub idler and adjustable mounting assembly of a presently preferred embodiment shown mounted below a conveyor support structure and positioned at its maximum angular adjustment.
Figure 6:
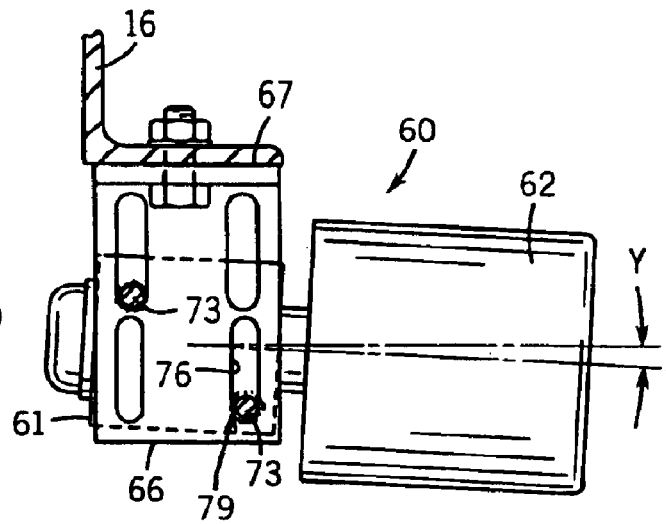
FIG. 6 is a view similar to FIG. 5 showing the stub idler at an intermediate angle of adjustment.

The present invention is directed to novel mounting means for a conveyor stub idler unit for flexible sidewall belt conveyors, as disclosed in my U.S. Pat. Nos. 4,844,241 and 5,027,940. More particularly, the present invention is directed to a unique mounting means for the stub idler unit, the mounting means affording the ability to vary the horizontal pitch or angle of the idler roll, vary the position of the roll linearly with respect to the conveyor support structure and the conveyor belt, and to remove a particular roll from its mounted position and maintain, replace or interchange the roll with a new roll which may be of a varying size.

A basic embodiment and a presently preferred embodiment of the invention are described in the following specification and depicted in the attached drawings. It should be understood that the drawings and specification are to be considered an exemplification of the principles of the invention, which is more particularly defined in the appended claims.

As shown in FIG. 1, three pairs of stub idler units 22 support an endless flexible side wall belt 10 of belt conveyor 12 for transport of various products 14 and particularly fibrous, particulate and like products. The conveyor includes the flexible sidewall belt 10 which travels about a Z-shaped conveyor support structure 16. The conveyor sidewall belt 10 is endless and suitably supported at its opposite ends with a drive pulley 18 and tail pulley 20. The belt 10 includes a flat base member 24 having similar side walls 26 secured to opposite edges of the belt base member 24. Each of the side walls 26 is a serpentine element standing on an edge and secured to the belt 10 to confine the material 14 on the belt 10. Lateral cleats (not shown) secured to the belt 10 at longitudinally spaced positions are to support the material 14 on the inclined portion of the belt 10 and insure transport and upward carrying of the material 14. Such belts are well known and widely used in the industry. The belt structure with the flexible side wall 26 and cleats 28 provide a relatively significant weight on the belt 10.

Referring to FIG. 3, each stub idler roll unit 22 includes a rotating roll 30 which is rigidly affixed to a solid shaft 32 extending through a bearing support means 34. The roll 30 has a generally smooth cylindrical face 36 and is designed to support the belt 10 of the conveyor 12. The solid shaft 32 is rigidly coupled to an end 38 of the roll 30 and extends axially therefrom. The shaft 32 is supported by bearing support means 34 as detailed in my above referenced U.S. Pat. Nos. 4,844,241 and 5,027,940. As detailed in these patents, the bearing support means 34 are adapted to permit the use of a cantilevered solid shaft equal in size to the same size conventional idler, and still accept the high load exerted by the belt 10. Likewise, bearing support means 34 may include a grease fitting (not shown) and thus can be properly and conveniently lubricated.

According to the present invention, a pair of opposing, back-to-back L-shaped brackets 40, shown in FIG. 4, are adapted to movably secure the stub idler unit 22 to the support structure 16 of the belt conveyor 12. Each L-shaped bracket includes a bearing mounting face 42 transversely oriented to a conveyor mounting face 44.

As shown in FIG. 3, the conveyor mounting face 44 includes an open ended elongated slot 46 for adjustably mounting the stub idler unit 22 to the support structure 16. A connector 54, such as for example a bolt, extends through the support structure 16 and the conveyor mounting face 44 to rigidly and releasably couple the L-shaped bracket 40 to the underside of support structure 16, such as shown in FIG. 2. Such an arrangement facilitates precise orientation and location of the end face 48 of the roll 30 with respect to the adjacent side wall 26 on the belt 10. Such an arrangement also affords adjustable positioning of the bracket 40 relative to the support structure 16 as shown by arrows 47 in FIG. 2.

As shown in FIGS. 2 and 4, the bearing mounting face 42 includes an upper elongated slot 50 and a substantially parallel lower elongated slot 52. The upper elongated slot 50 and lower elongated slot 52 are offset and spaced apart equidistant from the center of the bearing mounting face 42. A connector 54 for the upper elongated slot 50 and a connector 56 for the lower elongated slot 52 releasably couple the bearing support means 34 to the opposing L-shaped brackets 40. The positions of the connectors 54 relative to the elongated slots 50, 52 and the bearing support means 34 determines the pitch of the stub idler roll 30.

Preferably, the spacing and sizes of the upper elongated slot 50 and lower elongated slot 52 are such that when the stub idler unit 22 is coupled to the conveyor 12, the pitch of the roll 30 is adjustable up to and between 0°–5° from horizontal center. The elongated slots 50 and 52 permit linear adjustment of the stub idler unit 22 with respect to the brackets 40 (and conveyor support structure 16) along the full length of the slots. In addition, one of the slots, such as slot 50, is wider than the diameter of the shank of bolt 54, such that there is a lateral clearance 53 between the bolt shank and the edge 51 of the slot, while the other slot 52 has a width just slightly larger than the shank of the bolt 56. In this manner, the stub idler unit 22 may be rotated around the axis of lower bolt 56 through a small circular arc of about 5° as a result of the increased width of slot 50.

By affording the ability to adjust the position of the rotating roll 30 relative to the belt 10, line contact between the roll and the belt is provided and the likelihood of uneven wear on both the belt and the rolls is lessened. In addition, line contact between the roll and the belt prevents the transmission of axial loads to the bearings. Such an arrangement also better facilitates maintenance, repair or replacement of the idler roll.

Referring now to FIGS. 5–8 and 10, a stub idler unit 60, substantially identical to the stub idler unit 22 described above, is shown with a mounting bracket assembly of a presently preferred embodiment. A bearing block 61 has a generally cubic shape and rotatably supports a roll 62 mounted on a shaft 63, as previously described. The bearing block 61 has opposite attachment faces 64, each of which faces is provided with four tapped bolt holes 65 arranged in a square pattern. A mounting bracket 66 is adapted to be attached to each attachment face 64 of the bearing block 61 in a manner that provides linear and angular adjustment of the bearing block 61 and attached roll 62 with respect to the brackets 66 and conveyor support structure 16. The mounting brackets 66 are made from L-shaped angle members and provided in matched pairs such that their respective conveyor mounting faces 67 extend in opposite directions from the bearing block 61 (in a manner shown in the previous embodiment of FIG. 3). Similarly, the conveyor mounting face 67 of the bracket is provided with an open mounting slot 68. The slots 68 are oriented in each of the matched pair of mounting brackets so that the opening to the slot 68 faces the conveyor 12 so that the entire stub idler unit 60 and mounting brackets 66 can be readily installed by moving them laterally into place from the outside of the conveyor.

Figure 7:
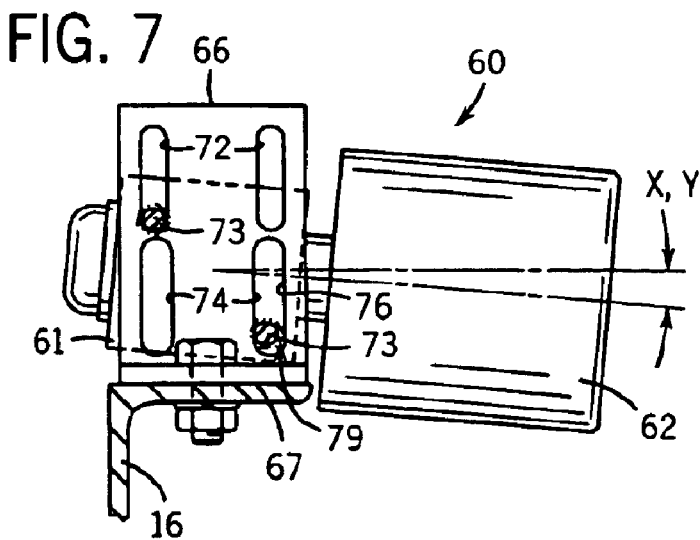
FIG. 7 is a side view of the stub idler and adjustable mounting assembly of FIGS. 5 and 6 mounted above the conveyor support structure and set at the maximum angle of decline with respect to the horizontal.
Figure 8:
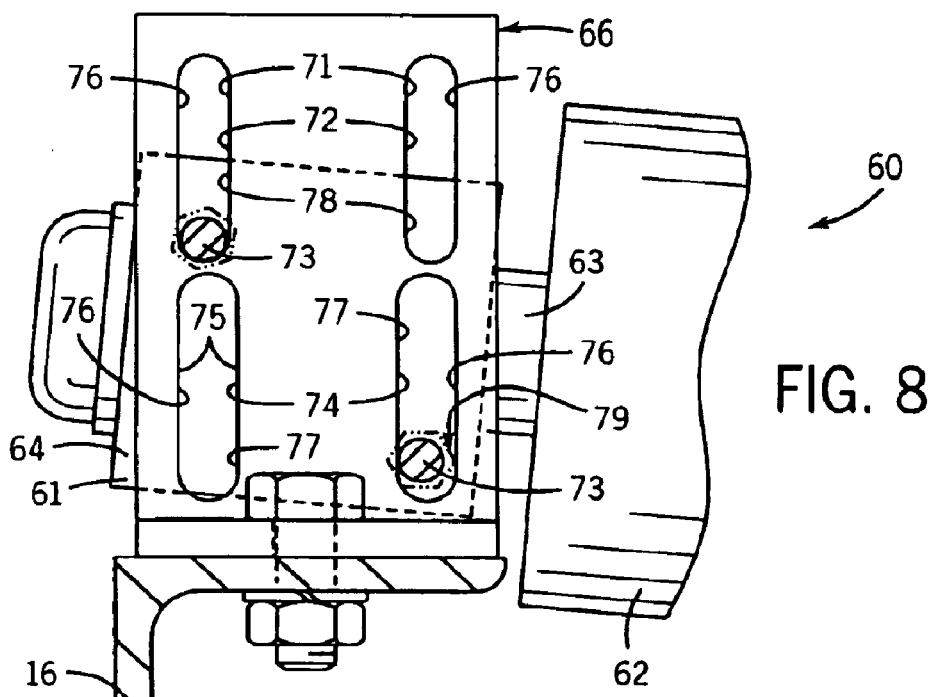
FIG. 8 is an enlarged side elevation view of the universal mounting bracket of the present invention.

The other leg of each mounting bracket 68 comprises a bearing mounting face 70 in which are formed four elongated slots 71. In the bracket orientation shown in FIGS. 7 and 8, the slots 71 include a pair of laterally spaced upper slots 72, each having a width just slightly larger than the diameter of a connecting bolt 73 such that the bolt may move linearly along the slot but is restricted from lateral movement. Each bracket also includes a pair of lower slots 74 generally aligned with the upper slots 72. The lower slots have a width somewhat larger than the upper slots and the diameter of the connecting bolt 73 such that there is a lateral clearance 79 between the bolt shank and the edge 76 of the slot and the bolt can move laterally in the slot. Each mounting bracket 66 is attached to an attachment face 64 of the bearing block 61 with a pair of bolts 73 threaded into bolt holes 65 in a diagonally oriented pair of an upper slot 72 and a lower slot 74, as shown in FIGS. 7 and 8. In the inverted mounting of the stub idler units 60, in FIGS. 5 and 6, the position of the slots 72 and 74 is reversed. Referring again to FIGS. 7 and 8, the connecting bolts 73 are shown at or near the bottom of the respective slots 72 and 74 and the stub idler unit 60 is thus at its lowermost position in the bracket pair. In this position and with the connecting bolts 73 loosened, the stud idler unit is pivotable about the axis of the upper connecting bolt in slot 72, permitting the idler unit 60 to be rotated slightly between the vertical side edges 75 of the widened lower slot 74. The width of the lower slot 74 accommodates angular adjustment of the axis of the roll 62 from a horizontal position to a downwardly inclined angle of about 5° (angle X in FIG. 7) from the horizontal with the lower connecting bolt 73 in engagement with the inner vertical side edge 75 of the lower slot 74. When the stub idler unit 60 is in its selected linear and angular position, the connecting bolts 73 are simply tightened, desirably utilizing an interposed lock washer (not shown).

With continuing reference to FIG. 8, the laterally outer edges 76 of each vertically aligned pair of slots 72 and 74 are co-linear. However, because the lower slots 74 are wider than the upper slots 72, the laterally inner edges of each vertical aligned pair of an upper slot 72 and a lower slot 74 are not co-linear, rather the inner edges 77 of the lower slots 74 are more closely spaced than the laterally inner edges 78 of the upper slots 72. This specific orientation permits a single pair of brackets to be utilized to mount a stub idler unit 60 to either the upper face of the support structure 16 (FIGS. 7 and 8) or the lower face of the support structure 16 (FIGS. 5 and 6) in a manner that permits angular adjustment of the roll axis from horizontal to a downwardly inclined angle of 5°, and to further assure that the open mounting slots 68 on both of the pair of mounting brackets 66 are oriented toward the roll 62 and the conveyor structure.

Figure 9:
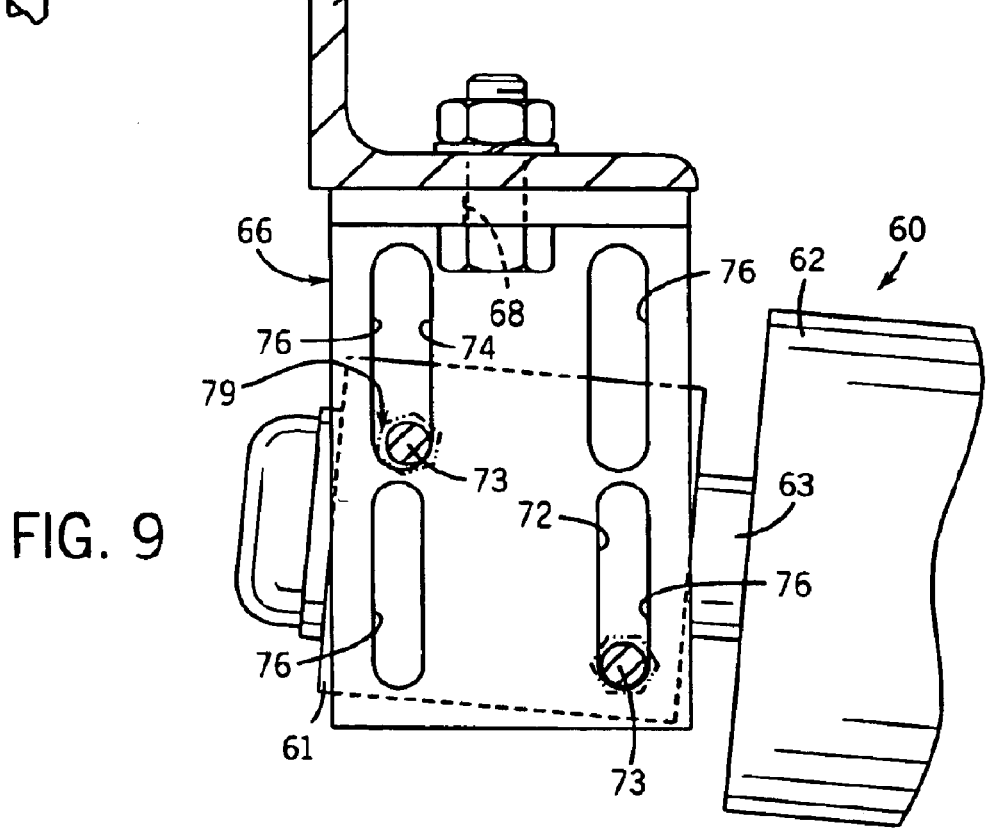
FIG. 9 is an enlarged side elevation view similar to FIG. 8, but showing the mounting assembly in an inverted position on the underside of the conveyor support structure.
Figure 10:
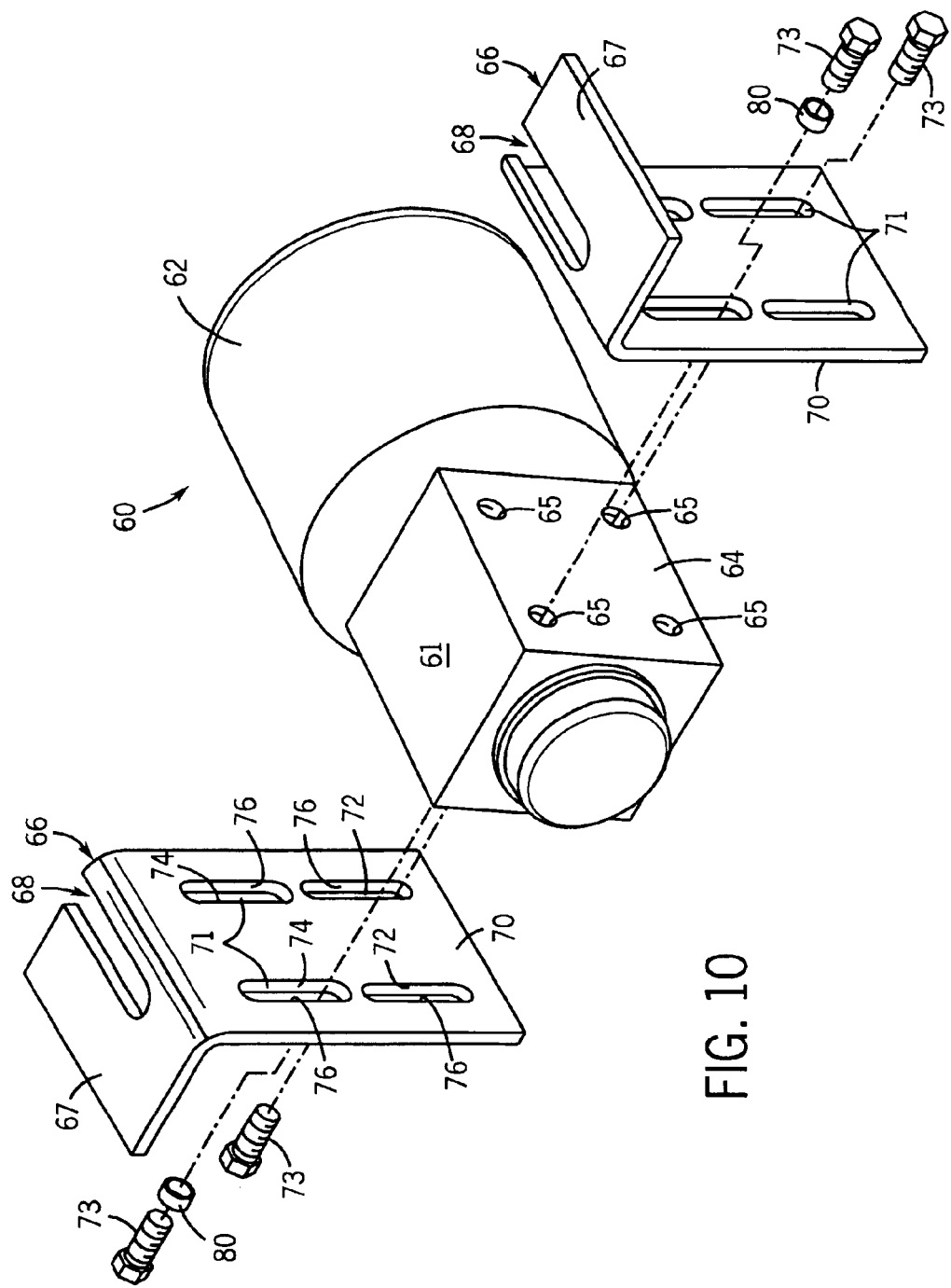
FIG. 10 is a perspective view similar to FIG. 4 showing the presently preferred embodiment of the invention in an exploded arrangement.

Referring now to FIG. 9, there is shown an inverted mounting of a stub idler unit 60, on the underside of the conveyor support structure 16 and on the opposite side of the conveyor from the views in FIGS. 5–8. This mounting arrangement utilizes the other of the matched pair of brackets and the other diagonal pair of slots 72 and 74, the upper slot now being the wider of the two and the one in which angular adjustment of the position of the connecting bolt 73 may be attained. Because it is a commonly adopted industry standard to provide an intermediate downward angle for the stub idler of about 3°, an alignment means shown in FIG. 10 is provided for the installer so that the connecting bolt 73 in the wider slot 74 can be easily centered in the slot before the bolt is tightened to assure positioning at about the 3° angle (Y in FIG. 6). The centering means comprises a bushing 80 that has an axial thickness approximately equal to the thickness of the mounting bracket leg, an OD approximately equal to the width of the wide slot 74, and an ID sized to permit the bushing 80 to be slipped over the connecting bolt and into the slot 74.

Although it is possible to provide the described linear and angular adjustment of the stub idler unit 60 on the mounting brackets 66 using a vertically aligned pair of an upper and lower mounting slot 72 and 74, it is preferred to use the described diagonal mounting (as shown in FIG. 8). The greater distance between the diagonally oriented connecting bolts 73 provides better resistance to torque and moment loading of the idler roll 62. In lieu of connecting bolts 73, it is also possible to use threaded studs that are initially threaded into a pair of the tapped bolt holes 65 in the bearing block 61 and to attach the brackets to the bearing block with nuts and lock washers. However, such an arrangement is not preferred because the user would have to determine in advance which diagonally oriented pair of bolt holes 65 would be required for the particular orientation of the idler unit 60, i.e. above the conveyor support structure 16 or below the structure.

While this invention is susceptible of embodiments in many different forms, the drawings and the specification describe in detail a preferred embodiment of the invention. They are not intended to limit the broad aspects of the invention to the embodiment illustrated.

I claim:

1. A universal mounting bracket for adjustably mounting a stub idler assembly to a support structure on a conveyor, said mounting bracket comprising:

a bearing mounting face having a pair of elongated slots formed therein, said slots sized and positioned to receive connectors for mounting the bracket to the idler assembly in a manner providing linear and angular adjustment of the idler assembly with respect to the bracket; and a conveyor mounting face for mounting the bracket to the support structure of the conveyor.

2. The mounting bracket as set forth in claim 1 wherein the bracket is formed from an L-shaped angle member with the bearing mounting face on one leg of the L-shaped member and the conveyor mounting face on the other leg of said member.

3. The mounting bracket as set forth in claim 1 wherein said slots are parallel and oriented for linear adjustment on a line generally perpendicular to the conveyor mounting face.

4. The mounting bracket as set forth in claim 3 wherein the connectors comprise a pair of bolts; and one of said slots is dimensioned to receive one of the bolts with a slip fit and the other slot is dimensioned to receive the other bolt with lateral clearance.

5. The mounting bracket as set forth in claim 4 wherein said slots are offset linearly from one another.

6. The mounting bracket as set forth in claim 5 including a second pair of elongated slots formed in the bearing mounting face, the second pair of slots sized and dimensioned the same as said first named elongated slots and aligned therewith to form a generally rectangular slot pattern, said slot pattern comprising a pair of laterally aligned slots dimensioned to alternately receive one of the bolts with a slip fit and, linearly offset therefrom, a pair of laterally aligned slots dimensioned to alternately receive one of the bolts with a clearance.

7. The mounting bracket as set forth in claim 2 including a mounting slot in the leg of the angle member with the bearing mounting face for receipt of a mounting connector.

8. The mounting bracket as set forth in claim 7 wherein the mounting slot extends from an open end in one edge of said one leg and generally perpendicular to said elongated slots in said other leg.

9. A stub idler and adjustable mounting assembly for mounting the stub idler to a support structure on a conveyor, said assembly comprising:

a bearing block rotatably supporting the stub idler, said bearing block including a flat attachment face having a pair of first connector halves;

a mounting bracket having a bearing mounting face with a pair of elongated slots formed therein, said slots sized and positioned to align with said first connector halves and to accommodate a pair of second connector halves for mounting the bracket to the bearing block attachment face in a manner providing linear and angular adjustment of the mounting bracket bearing block and stub idler with respect to the bearing block and stub idler mounting bracket.

10. The assembly as set forth in claim 9 wherein said bearing block includes a pair of parallel attachment faces on opposite sides of said block, and a mounting bracket for each attachment face.

11. The assembly set forth in claim 9 wherein the connectors comprise threaded fasteners.

12. The assembly as set forth in claim 11 wherein each fastener comprises a threaded recess in the attachment face of the bearing block and a bolt.

* * * * *

UNITED STATES PATENT AND TRADEMARK OFFICE
CERTIFICATE OF CORRECTION

PATENT NO. : 6,955,257 B2
DATED : December 2, 2005
INVENTOR(S) : William S. Woodward It is certified that error appears in the above-identified patent and that said Letters Patent is hereby corrected as shown below:

Column 8,
Line 28, "mounting bracket" should be deleted.
Lines 29-30, "bearing block and stub idler" should be deleted.

Signed and Sealed this

Seventh Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,955,257 B2  Page 1 of 1
DATED : October 18, 2005
INVENTOR(S) : William S. Woodward It is certified that error appears in the above-identified patent and that said Letters Patent is hereby corrected as shown below:

<u>Column 8,</u>
Line 28, "mounting bracket" should be deleted.
Lines 29-30, "bearing block and stub idler" should be deleted.

This certificate supersedes Certificate of Correction issued February 7, 2006.

Signed and Sealed this

Twenty-first Day of March, 2006

JON W. DUDAS
*Director of the United States Patent and Trademark Office*